Dec. 23, 1952  G. M. GUSTIN  2,622,637
GAUGE FOR SAWING MACHINES
Filed Jan. 5, 1949  2 SHEETS—SHEET 1

INVENTOR.
George M. Gustin
BY
W. P. Hahn
ATTORNEY.

Dec. 23, 1952  G. M. GUSTIN  2,622,637
GAUGE FOR SAWING MACHINES
Filed Jan. 5, 1949  2 SHEETS—SHEET 2

INVENTOR.
George M. Gustin
BY
W. P. Hahn
ATTORNEY.

Patented Dec. 23, 1952

2,622,637

UNITED STATES PATENT OFFICE 2,622,637

GAUGE FOR SAWING MACHINES

George M. Gustin, Wabash, Ind.

Application January 5, 1949, Serial No. 69,371

1 Claim. (Cl. 143—174)

The present invention relates to improvement in gauges and particularly to gauges for use in connection with sawing machines primarily of the wood saw type. One of the objects of the invention is to provide a gauge for accurately positioning the work relatively to the saw for determining the width of the material to be cut by the saw.

Another object of the invention is to provide a gauge which may be readily attachable to a saw table and which, when so attached, may be readily moved to accurately determine the cut to be made by the saw.

Another object of the invention is to provide a gauge which may be quickly and easily locked in its adjusted position by the simple manipulation of a locking handle and which will, when so locked, maintain the gauge in its locked position with its position accurately determined.

Another object of the invention is to provide a locking means which may be adjusted to compensate for wear of the locking parts.

For purpose of disclosing the invention an embodiment thereof is illustrated in the accompanying drawings, in which.

Figure 1:
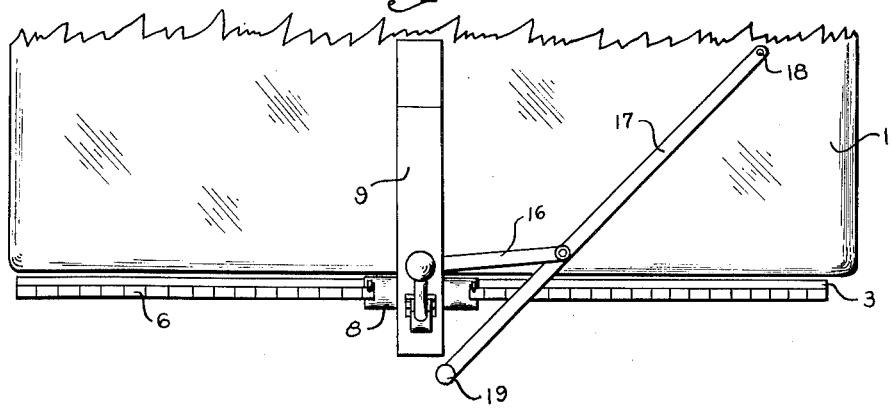
Fig. 1 is a plan view of a portion of a saw table showing the improved gauge applied thereto.
Figure 2:
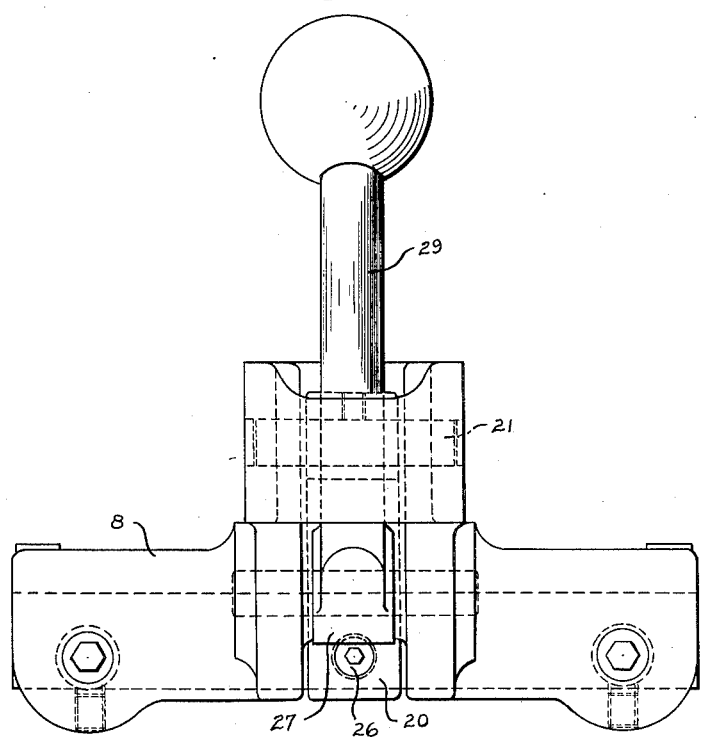
Fig. 2 is an end elevation of the gauge carriage.
Figure 3:
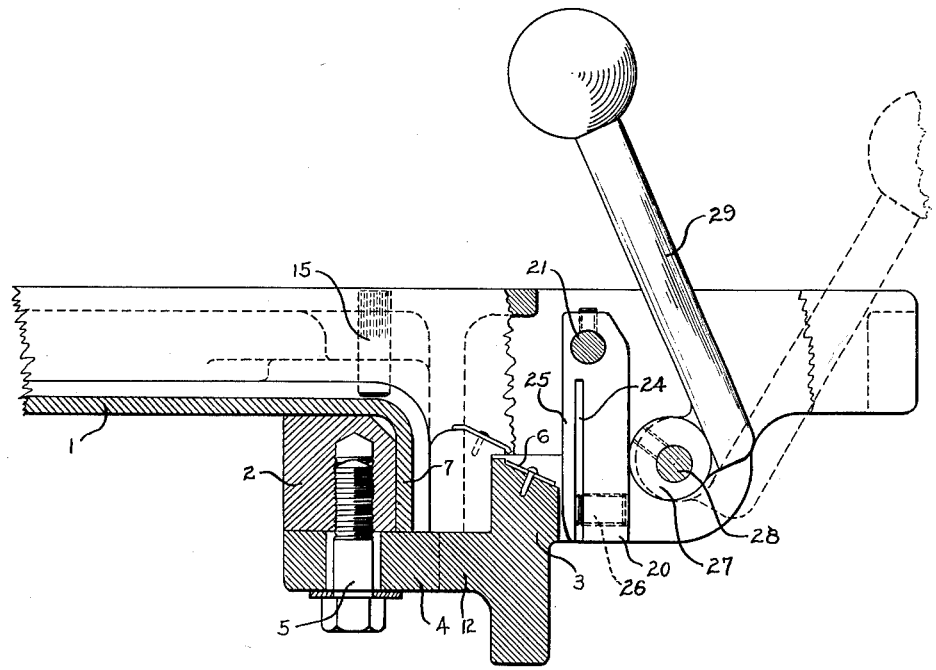
Fig. 3 is a side elevation, partly in section and partly broken away of the gauge to show the operating parts.
Figure 4:
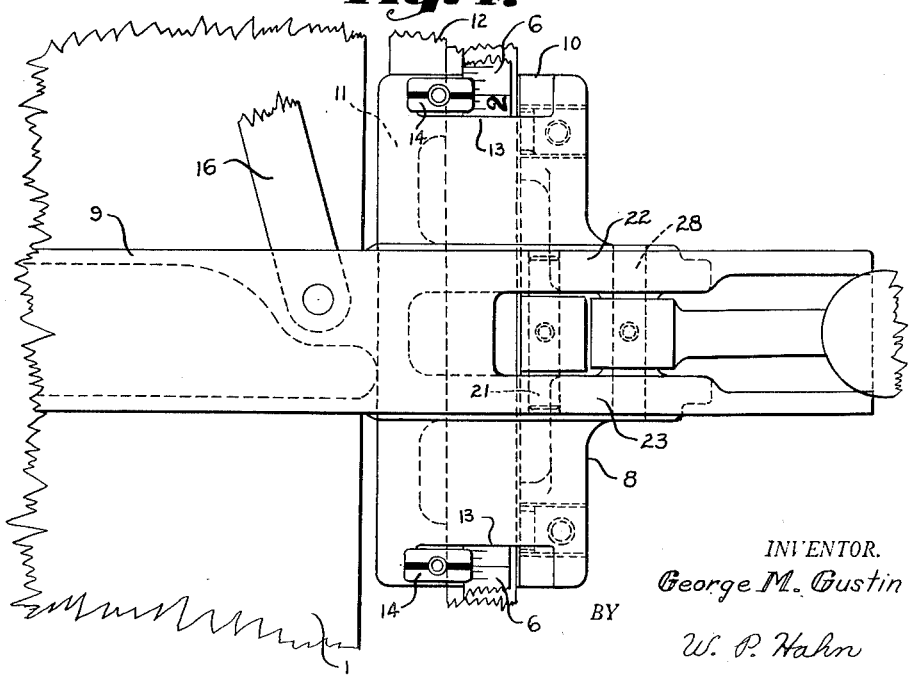
Fig. 4 is a plan view of the gauge carriage.

In the embodiment of the invention illustrated the gauge is adapted to be secured to one end of a saw table provided with a rotary saw, not shown, and is adapted to move parallel with the axis of the saw.

To this end the table top 1 is secured upon a frame and has a plurality of blocks 2 depending therefrom. A guide rail 3 is secured to the table by a plurality of transversely extending ears 4 which are bolted by means of bolts 5 to the underface of the blocks 2. The guide rail 3 extends substantially throughout the width of the table and is provided on its upper face with a suitable index 6 which may be marked in inches or fraction of inches or other desired measurements. By the provision of the ears 4 the guide rail 3 is spaced apart from the down turned side portion 7 of the table top 1.

The gauge is provided with a bracket or carriage 8 which is slideably mounted on the guide rail 3 and carries a gauge arm 9 extending across the face of the table. The bracket and gauge arm are preferably formed of a single casting which may be, for the purpose of lightness, cast from aluminum. The carriage 8 on its underface is provided with a pair of spaced apart ribs 10 and 11 which are adapted to embrace the guide rail 3 and the rib 11 rests and slides upon the bottom rail 12 of the guide rail 3. At one point the top of the carriage 8 is cut away as at 13 and an index marker 14 is attached thereto for cooperation with the index 6 on top of the guide rail 3.

The carriage 8 is integrally formed with the gauge arm 9 which may be of a hollow casting and is provided with a pivot pin 15 on which is pivoted an arm 16 in turn pivotally connected to swingable arm 17 pivoted at 18 to the table and provided at its free end with a handle 19 by which the arm may be swung on its pivot and move the carriage along its track to properly position same.

To lock the carriage 8 in its adjusted position I provide a pivotally mounted swingable clamping and locking arm 20 which is secured at its upper end to a rocker shaft 21 journalled between the two side members 22 and 23 of the gauge arm. This swingable arm 20 is slotted as at 24 throughout a greater portion of its length to provide a resilient tongue 25 adapted to bear against the side of the guide rail 3 for frictional clamping engagement therewith. The lower end of this resilient tongue 25 is held against displacement relative to the rigid body portion of the arm by an adjustable screw 26 extending through the body portion and bearing against the lower free end of the resilient tongue 25 whereby said tongue may be adjustably displaced to vary and control the overall effective thickness of the arm. The arm 20 upon being adjusted as to its thickness by the screw 26 is swung into locking engagement with the rail 3 through the medium of a cam 27 fixed on a pivot member 28 having its bearing in the two side arms 22 and 23 of the gauge arm 9. Said cam is swung into and out of locking position through the medium of a handle 29 integral therewith and extending upwardly through an opening in the top of the gauge arm. The cam 27 is positioned to have a wide bearing engagement surface with the rigid body portion of the arm 20 which carries the adjustment screw 26 into engagement with the adjacent surface of the resilient tongue 25, said tongue in turn being forced into frictional locking contact with the rail 3.

In operation the gauge arm 9 and its carriage may be swung to its index position by the manipulation of the handle 19 on the lever 17. When moved to its proper index position the handle 29 may then be pushed forward causing the cam 27 to bear against the arm 20 and wedge the tongue 25 against the side of the rail 3 to securely lock the gauge and its carriage to the guide rail 3. A reverse movement of the arm 29 will, of course, immediately remove the pressure on the arm 20 unlocking the gauge.

A very nice adjustment of the tongue 25 relative to the side face of the rail 3 may be obtained by means of the set screw 26 and as wear occurs on the face of the tongue 25 this tongue may be moved further toward the side rail to compensate for this wear. Likewise, compensation may be made for wear of the face of the cam.

The gauge is frequently operated without the use of the swinging arm 17 and its accompanying handle 19. In some instances the link 16 and the arm 17 may be entirely removed or at least disconnected.

Under these circumstances the locking handle 29 provides not only a handle for locking the gauge in position, but also means for moving the gauge to its adjusted position. Normally the operator stands at the front of the table which is that edge of the table carrying the index rail 6 and by grasping the handle 29 he may easily move the gauge to any position desired. When the gauge is moved to the desired position it may be readily locked in that position by the operator merely pushing forward on the handle 29.

I claim as my invention:

In a gauge for sawing machines having a table for supporting the work to be sawed, the combination with a guide rail of means for securing said rail to the saw table, a gauge arm slideable across the table and having a carriage portion slideable to adjusted positions on said rail, a swingable locking arm hingedly mounted on said carriage portion, said locking arm being slotted throughout the greater portion of its length from the free end thereof toward its hinged portion to provide a resilient tongue portion frictionally engageable with said rail and a rigid body portion having an opposed bearing surface, an adjustment screw mounted in the rigid body portion of said arm extending through the slot into engagement with the resilient tongue portion for adjusting the effective thickness of said arm, and a rotatable cam mounted in said carriage for engagement with said bearing surface of the arm for forcing the tongue portion into frictional clamping engagement with said rail.

GEORGE M. GUSTIN.

REFERENCES CITED

The following references are of record in the file of this patent:

UNITED STATES PATENTS

| Number | Name | Date |
| --- | --- | --- |
| 378,939 | Seymour | Mar. 6, 1888 |
| 2,075,282 | Hedgpeth | Mar. 30, 1937 |
| 2,140,323 | Lonskey | Dec. 13, 1938 |
| 2,265,335 | Aumann | Dec. 9, 1941 |
| 2,325,082 | Tautz | July 27, 1943 |
| 2,342,700 | Schnitzer | Feb. 29, 1944 |

FOREIGN PATENTS

| Number | Country | Date |
| --- | --- | --- |
| 137,501 | Great Britain | Jan. 15, 1920 |